(12) United States Patent
Kobayashi et al.

(10) Patent No.: US 11,566,121 B2
(45) Date of Patent: Jan. 31, 2023

(54) THERMOPLASTIC ELASTOMER COMPOSITION FOR WEATHER STRIP MATERIAL AND WEATHER STRIP

(71) Applicant: ENEOS Materials Corporation, Tokyo (JP)

(72) Inventors: Masato Kobayashi, Tokyo (JP); Kodai Ozaki, Tokyo (JP)

(73) Assignee: ENEOS Materials Corporation, Tokyo (JP)

( * ) Notice: Subject to any disclaimer, the term of this patent is extended or adjusted under 35 U.S.C. 154(b) by 137 days.

(21) Appl. No.: 17/167,098

(22) Filed: Feb. 4, 2021

(65) Prior Publication Data

US 2021/0246287 A1  Aug. 12, 2021

(30) Foreign Application Priority Data

Feb. 12, 2020  (JP) .............. JP2020-021287

(51) Int. Cl.
| | |
|---|---|
| *C08L 23/08* | (2006.01) |
| *C08L 23/06* | (2006.01) |
| *C08L 23/12* | (2006.01) |
| *C08L 23/14* | (2006.01) |
| *C08L 53/00* | (2006.01) |
| *C08F 8/04* | (2006.01) |
| *C08F 136/06* | (2006.01) |

(52) U.S. Cl.
CPC ............ *C08L 23/0815* (2013.01); *C08F 8/04* (2013.01); *C08F 136/06* (2013.01); *C08L 23/06* (2013.01); *C08L 23/12* (2013.01); *C08L 23/142* (2013.01); *C08L 53/00* (2013.01); *C08L 2201/08* (2013.01); *C08L 2203/30* (2013.01); *C08L 2205/035* (2013.01); *C08L 2207/04* (2013.01)

(58) Field of Classification Search
CPC .... C08I 23/08; C08I 23/12; C08I 23/16; C08I 53/025
See application file for complete search history.

(56) References Cited

U.S. PATENT DOCUMENTS

| | | | | |
|---|---|---|---|---|
| 5,643,999 | A * | 7/1997 | Lee ................. | C09J 123/16 525/193 |
| 6,153,704 | A * | 11/2000 | Kodama ........... | C08L 23/16 525/240 |
| 6,323,286 | B1 * | 11/2001 | Kuramochi ........ | C08L 53/00 525/89 |
| 2004/0086707 | A1 * | 5/2004 | Saita ................. | C08L 23/10 428/323 |
| 2007/0135576 | A1 * | 6/2007 | Ono .................. | C08L 23/16 525/192 |
| 2007/0237922 | A1 * | 10/2007 | Miyakawa ......... | B60J 10/18 49/440 |
| 2010/0068432 | A1 * | 3/2010 | Horasawa ......... | B41J 2/17559 524/505 |

FOREIGN PATENT DOCUMENTS

JP  2016113614  6/2016

\* cited by examiner

*Primary Examiner* — Mark S Kaucher
(74) *Attorney, Agent, or Firm* — JCIPRNET

(57) ABSTRACT

Provided is a thermoplastic elastomer composition for a weather strip material which is used for obtaining a molded product which has excellent adhesiveness to both a thermoplastic elastomer adherend and a crystalline ethylene resin adherend and also has excellent heat resistance at a fused portion. The thermoplastic elastomer composition for a weather strip material according to the disclosure contains: an ethylene-α-olefin copolymer rubber (A); an α-olefin crystalline thermoplastic resin (B) having a melting point of 140° C. or higher; an olefin block copolymer (C) obtained by hydrogenating a block copolymer which has a conjugated diene polymer block with a 1,2-vinyl bond content of 25 mol % or less at both ends and also has a conjugated diene polymer block with a 1,2-vinyl bond content of more than 25 mol % in the middle; and a crystalline ethylene resin (D).

9 Claims, No Drawings

THERMOPLASTIC ELASTOMER COMPOSITION FOR WEATHER STRIP MATERIAL AND WEATHER STRIP

CROSS-REFERENCE TO RELATED APPLICATION

This application claims the priority of Japan patent application serial no. 2020-021287, filed on Feb. 12, 2020. The entirety of the above-mentioned patent application is hereby incorporated by reference herein and made a part of this specification.

BACKGROUND

Technical Field

The disclosure relates to a thermoplastic elastomer composition for a weather strip material, and a weather strip using a molded product consisting of this composition.

Related Art

Thermoplastic elastomers (TPE) are used in various fields such as automobiles, home appliances, medical care, foods, electric wires, and daily necessities. Particularly in the field of automobiles, the thermoplastic elastomer is attracting attention as an alternative material to vulcanized rubber mainly from the viewpoints of productivity, low cost, design freedom, weight reduction, and recyclability.

Particularly, weather strips, which are one of the automobile parts, tend to replace vulcanized rubber with thermoplastic elastomers. For example, patent literature 1 discloses a weather strip consisting of a thermoplastic elastomer composition which contains an olefin rubber, a hydrogenated block copolymer, and a polyolefin resin other than the olefin rubber.

LITERATURE OF RELATED ART

Patent Literature

[Patent literature 1] Japanese Patent Laid-open No. 2016-113614

In recent years, due to the diversification of automobile designs, when a weather strip is designed, there is an increasing need for composite members in which a molded product consisting of a thermoplastic elastomer composition and a molded product consisting of a crystalline ethylene resin are melt-adhered. However, although the conventional thermoplastic elastomer composition has excellent adhesiveness to the molded product consisting of a thermoplastic elastomer composition, the adhesiveness to the molded product consisting of a crystalline ethylene resin is not sufficient. Particularly, there is a problem that the heat resistance at a fused portion between the molded product consisting of a thermoplastic elastomer composition and the molded product consisting of a crystalline ethylene resin is insufficient, and the fused portion is easily destroyed by heating.

SUMMARY

One aspect of the thermoplastic elastomer composition for a weather strip material according to the disclosure contains:

an ethylene-α-olefin copolymer rubber (A);
an α-olefin crystalline thermoplastic resin (B);
an olefin block copolymer (C) being a hydrogenation product of a block copolymer which has a conjugated diene polymer block (c1) with a 1,2-vinyl bond content of 25 mol % or less at both ends and also has a conjugated diene polymer block (c2) with a 1,2-vinyl bond content of more than 25 mol % in the middle; and
a crystalline ethylene resin (D).

In one aspect of the thermoplastic elastomer composition for a weather strip material,
the melting point of the component (B) may be 135° C. or higher.

In any aspect of the thermoplastic elastomer composition for a weather strip material,
when the total mass of the thermoplastic elastomer composition is 100 parts by mass, the content ratio of the component (A) may be 10 to 50 parts by mass, the content ratio of the component (B) may be 1 to 15 parts by mass, the content ratio of the component (C) may be 4 to 50 parts by mass, and the content ratio of the component (D) may be 10 to 50 parts by mass.

In any aspect of the thermoplastic elastomer composition for a weather strip material,
when the total of the conjugated diene polymer block (c1) and the conjugated diene polymer block (c2) contained in the component (C) is 100 parts by mass, the content ratio of the conjugated diene polymer block (c1) may be 5 to 90 parts by mass.

One aspect of the weather strip according to the disclosure uses a molded product consisting of the thermoplastic elastomer composition for a weather strip material of any one of the above aspects.

DESCRIPTION OF THE EMBODIMENTS

In some aspects according to the disclosure, a thermoplastic elastomer composition for a weather strip material for obtaining a molded product (composite member) is provided, the molded product having excellent adhesiveness to both a thermoplastic elastomer adherend and a crystalline ethylene resin adherend and also having excellent heat resistance at a fused portion. In addition, some aspects according to the disclosure provide a weather strip using a molded product consisting of this composition.

According to the thermoplastic elastomer composition of the disclosure, a molded product (composite member) can be manufactured which has excellent adhesiveness to both a thermoplastic elastomer adherend and a crystalline ethylene resin adherend and also has excellent heat resistance at a fused portion.

Hereinafter, a preferred embodiment according to the disclosure is described in detail. Besides, it should be understood that the disclosure is not limited to the embodiment described below and includes various modifications implemented without changing the gist of the disclosure.

In the specification, the numerical range described using "to" means that the numerical values before and after "to" are included as a lower limit value and an upper limit value.

Besides, in the specification, the ethylene-α-olefin copolymer rubber (A) may be abbreviated as "component (A)", the α-olefin crystalline thermoplastic resin (B) may be abbreviated as "component (B)", the olefin block copolymer (C) obtained by hydrogenating a block copolymer which has a conjugated diene polymer block (c1) with a 1,2-vinyl bond content of 25 mol % or less at both ends and also has a conjugated diene polymer block (c2) with a 1,2-vinyl bond content of more than 25 mol % in the middle may be abbreviated as "component (C)", and the crystalline ethylene resin (D) may be abbreviated as "component (D)".

1. Thermoplastic Elastomer Composition for Weather Strip Material

The thermoplastic elastomer composition for a weather strip material according to one embodiment of the disclosure (hereinafter, also simply referred to as "thermoplastic elastomer composition") contains:
an ethylene-α-olefin copolymer rubber (A);
an α-olefin crystalline thermoplastic resin (B);
an olefin block copolymer (C) being a hydrogenation product of a block copolymer which has a conjugated diene polymer block (c1) with a 1,2-vinyl bond content of 25 mol % or less at both ends and also has a conjugated diene polymer block (c2) with a 1,2-vinyl bond content of more than 25 mol % in the middle; and a crystalline ethylene resin (D).
Hereinafter, each component contained in the thermoplastic elastomer composition according to the embodiment is described.

1.1. Component (A)

The thermoplastic elastomer composition according to the embodiment contains an ethylene-α-olefin copolymer rubber (A). The component (A) is a copolymer rubber containing a repeating unit derived from ethylene and a repeating unit derived from α-olefin. The component (A) may contain a repeating unit derived from a monomer other than ethylene and α-olefin. The component (A) may be any one of a random copolymer, an alternating copolymer, and a block copolymer, but is preferably a random copolymer.

As the α-olefin, an α-olefin having 3 to 10 carbon atoms is preferable, and an α-olefin having 3 to 8 carbon atoms is more preferable. Specific examples of the α-olefin include propylene, 1-butene, 2-methylpropene, 1-pentene, 3-methyl-1-butene, 1-hexene, 4-methyl-1-pentene, 1-octene, and the like. When the component (A) is synthesized, these α-olefins may be used alone, or two or more of the α-olefins may be used in combination.

The monomer other than ethylene and α-olefin may be: a conjugated diene compound having 4 to 8 carbon atoms such as 1,3-butadiene, 2-methyl-1,3-butadiene, 1,3-pentadiene, and 2,3-dimethyl-1,3-butadiene; a non-conjugated diene compound having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl carboxylate such as vinyl acetate; unsaturated carboxylate such as methyl acrylate, ethyl acrylate, butyl acrylate, methyl methacrylate, and ethyl methacrylate; unsaturated carboxylic acid such as acrylic acid and methacrylic acid. Particularly, a non-conjugated diene compound having 5 to 15 carbon atoms is preferable, and 5-ethylidene-2-norbornene and dicyclopentadiene are more preferable. When the component (A) is synthesized, these monomers other than ethylene and α-olefin may be used alone, or two or more of the monomers may be used in combination.

When the total mass of the component (A) is 100 mass %, the content ratio of the repeating unit derived from the ethylene in the component (A) is preferably 40 to 85 mass %, more preferably 50 to 80 mass %, and particularly preferably 55 to 70 mass %.

When the total mass of the component (A) is 100 mass %, the content ratio of the repeating unit derived from the α-olefin in the component (A) is preferably 10 to 50 mass %, more preferably 15 to 45 mass %, and particularly preferably 25 to 40 mass %.

When the total mass of the component (A) is 100 mass %, the content ratio of the repeating unit derived from the monomers other than ethylene and α-olefin in the component (A) is preferably 0 to 15 mass %, more preferably 0 to 8 mass %, and particularly preferably 0 to 5 mass %.

The content ratio of the repeating unit derived from each monomer in the component (A) can be obtained by infrared spectroscopy. Specifically, an infrared absorption spectrum of the component (A) is measured using an infrared spectrophotometer, and the content ratio of the repeating unit derived from each monomer in the component (A) can be calculated according to the method described in "Characterization of polyethylene by infrared absorption spectrum (written by Takayama, Usami, and others)" or "Die Makromolekulare Chemie, 177, 461 (1976) (written by McRae, M. A., MadamS, W. F., and others)".

Specific examples of the component (A) include: an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, an ethylene-propylene-1-octene copolymer, an ethylene-propylene-5-ethylidene-2-norbornene copolymer, an ethylene-propylene-dicyclopentadiene copolymer, an ethylene-propylene-1,4-hexadiene copolymer, an ethylene-propylene-5-vinyl-2-norbornene copolymer, and the like. Particularly, an ethylene-propylene copolymer and an ethylene-propylene-5-ethylidene-2-norbornene copolymer are preferable. These components (A) may be used alone, or two or more of the components (A) may be used in combination.

Production examples of the component (A) include a method of copolymerizing ethylene, α-olefin, and a monomer other than ethylene and α-olefin in the presence of a known complex catalyst such as a Ziegler•Natta catalyst, a metallocene complex or a non-metallocene complex. The polymerization method may be slurry polymerization, solution polymerization, massive polymerization, gas phase polymerization, or the like.

When the total mass of the thermoplastic elastomer composition is 100 parts by mass, the content ratio of the component (A) is preferably 10 to 50 parts by mass, more preferably 12 to 45 parts by mass, and particularly preferably 15 to 40 parts by mass.

1.2. Component (B)

The thermoplastic elastomer composition according to the embodiment contains an α-olefin crystalline thermoplastic resin (B). The component (B) is a crystalline thermoplastic resin containing a repeating unit derived from α-olefin. The component (B) may contain a repeating unit derived from ethylene.

As the α-olefin, an α-olefin having 3 to 20 carbon atoms is preferable. Specific examples of the α-olefin include: propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 2-methylpropene, 3-methyl-1-butene, 3-methyl-1-pentene, 4-methyl-1-pentene, 2-ethyl-1-hexene, 2,2,4-trimethyl-1-pentene, and the like. When the component (B) is synthesized, these α-olefins may be used alone, or two or more of the α-olefins may be used in combination.

The content ratio of the repeating unit derived from each monomer in the component (B) can be obtained by the same method as the content ratio of each monomer unit in the component (A).

The component (B) may be a propylene homopolymer, a propylene random copolymer, or the like.

For example, the propylene random copolymer may be:
(1) a propylene-ethylene random copolymer containing a repeating unit derived from propylene and a repeating unit derived from ethylene;
(2) a propylene-ethylene-α-olefin random copolymer containing a repeating unit derived from propylene, a repeating unit derived from ethylene, and a repeating unit derived from a α-olefin having 4 to 20 carbon atoms; and
(3) a propylene-α-olefin random copolymer containing a repeating unit derived from propylene and a repeating unit derived from an α-olefin having 4 to 20 carbon atoms.

The method for producing the propylene homopolymer and the propylene random copolymer may be a method of polymerizing propylene and the like in the presence of a known complex catalyst such as a Ziegler•Natta catalyst, a metallocene complex or a non-metallocene complex. The polymerization method may be slurry polymerization, solution polymerization, massive polymerization, gas phase polymerization, or the like.

The melting point of the component (B) is preferably 135° C. or higher, more preferably 145° C. or higher, and particularly preferably 150° C. or higher. When the melting point of the component (B) is 135° C. or higher, heat resistance can be imparted to the obtained molded product, and in particular, heat resistance at the fused portion with another molded product can be improved.

From the viewpoint of obtaining good adhesiveness to both a thermoplastic elastomer adherend and a crystalline ethylene resin adherend, the melt flow rate of the component (B) measured in accordance with JIS K7210 under the conditions of a temperature of 230° C. and a load of 21.2 N is preferably 0.1 to 50 g/10 min, more preferably 0.1 to 25 g/10 min, and particularly preferably 0.1 to 15 g/10 min.

The density of the component (B) measured in accordance with JIS K7112 is not particularly limited, and is preferably 0.85 g/cm$^3$ or more and 0.95 g/cm$^3$ or less, and more preferably 0.87 g/cm$^3$ or more and 0.93 g/cm$^3$ or less.

When the total mass of the thermoplastic elastomer composition is 100 parts by mass, the content ratio of the component (B) is preferably 1 to 15 parts by mass, more preferably 2 to 10 parts by mass, and particularly preferably 3 to 8 parts by mass.

1.3. Component (C)

The thermoplastic elastomer composition according to the embodiment contains an olefin block copolymer (C) obtained by hydrogenating a block copolymer which has a conjugated diene polymer block (c1) with a 1,2-vinyl bond content of 25 mol % or less at both ends (hereinafter, also referred to as "block (c1)") and also has a conjugated diene polymer block (c2) with a 1,2-vinyl bond content of more than 25 mol % in the middle (hereinafter, also referred to as "block (c2)"). Here, the block (c1) and the block (c2) are blocks before hydrogenation. According to the thermoplastic elastomer composition of the embodiment, it has been clarified that particularly by using the component (C) and the component (D) in combination, a molded product (composite member) can be manufactured which has both good adhesiveness to a thermoplastic elastomer adherend and good adhesiveness to a crystalline ethylene resin adherend.

Besides, the "1,2-vinyl bond content" in the specification refers to the content of 1,2-vinyl bond among cis-1,4-bond, trans-1,4-bond, and 1,2-vinyl bond that are calculated by a Morero method using infrared absorption spectroscopy. Here, the 1,2-vinyl bond content refers to a 1,2-vinyl bond content of the polymer before hydrogenation.

The block (c1) is preferably a polymer block containing 1,3-butadiene as a main component. Besides, "containing 1,3-butadiene as a main component" means that 90 mass % or more, preferably 95 mass % or more of the entire repeating unit of the block (c1) is derived from 1,3-butadiene. In addition, from the viewpoint of suppressing a decrease in the melting point of the crystal after hydrogenation and maintaining the mechanical strength, the 1,2-vinyl bond content of the block (c1) is 25 mol % or less, preferably 20 mol % or less, and more preferably 15 mol % or less.

The number average molecular weight (Mn) of the block (c1) is preferably 25,000 to 650,000, and more preferably 50,000 to 450,000. When the number average molecular weight (Mn) is 25,000 or more, the mechanical properties tend to be improved. When the number average molecular weight (Mn) is 650,000 or less, the workability tends to be improved. Besides, the component (C) has the blocks (c1) at both ends, and the number average molecular weight (Mn) of the block (c1) refers to the total of the number average molecular weights (Mn) of the blocks (c1) at both ends.

The block (c2) is a conjugated diene polymer block having a structural unit derived from a conjugated diene compound. The conjugated diene compound may be 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene, or the like. Particularly, 1,3-butadiene, isoprene, and 1,3-pentadiene are preferable, and 1,3-butadiene is more preferable. Besides, the block (c2) may be composed of two or more kinds of monomer units.

The vinyl bond content of the block (c2) is more than 25 mol %, preferably more than 25 mol % and 95 mol % or less, and more preferably more than 25 mol % and 85 mol % or less. From the viewpoint of maintaining the flexibility of the component (C), the 1,2-vinyl bond content of the block (c2) is preferably more than 25 mol %.

The number average molecular weight (Mn) of the block (c2) is preferably 5,000 to 650,000, and more preferably 20,000 to 550,000. When the number average molecular weight (Mn) is 5,000 or more, the mechanical properties tend to be improved. When the number average molecular weight (Mn) is 650,000 or less, the workability tends to be improved.

The block (c2) in the molecular structure of the component (C) may contain an aromatic vinyl polymer block. When the block (c2) contains an aromatic vinyl polymer block, from the viewpoint of maintaining low temperature characteristics and flexibility, the content ratio of the aromatic vinyl polymer block is preferably 35 mass % or less, more preferably 30 mass % or less, and particularly preferably 25 mass % or less when the entire repeating unit of the block (c2) is 100 mass %.

The aromatic vinyl compound that is a repeating unit of the block (c2) in the molecular structure of the component (C) may be styrene, tert-butylstyrene, α-methylstyrene, p-methylstyrene, p-ethylstyrene, divinylbenzene, 1,1-diphenylstyrene, vinylnaphthalene, vinylanthracene, N,N-diethyl-p-aminoethylstyrene, vinylpyridine, or the like. Particularly, styrene is preferable.

When the total of the block (c1) and the block (c2) contained in the component (C) is 100 parts by mass, the content ratio of the block (c1) is preferably 5 to 90 parts by mass, and more preferably 10 to 80 parts by mass. When the content ratio of the block (c1) is 5 parts by mass or more, there is a tendency that it becomes easy for the component (C) to exhibit relatively sufficient crystallinity with respect to the component (A), and the thermoplastic elastomer composition according to the embodiment easily forms a three-dimensional network structure that is not based on chemical cross-linking. On the other hand, when the content ratio of the block (c1) is 90 parts by mass or less, it is possible to avoid an excessive increase in hardness. Besides, the "three-dimensional network structure" in the specification refers to a structure in which the thermoplastic elastomer composition according to the embodiment is bonded without chemical cross-linking to form a network structure in three dimensional directions.

For example, the olefin block copolymer before hydrogenation can be obtained by using an organic alkali metal compound as a polymerization initiator to perform, in an inert organic solvent, living anion polymerization on an aromatic vinyl compound and a conjugated diene compound, or on an aromatic vinyl compound, a conjugated diene compound and other monomers copolymerizable with the aromatic vinyl compound and the conjugated diene compound. The inert organic solvent may be: an aliphatic hydrocarbon solvent such as pentane, hexane, heptane, and octane; an alicyclic hydrocarbon solvent such as cyclopentane, methylcyclopentane, cyclohexane, and methylcyclohexane; an aromatic hydrocarbon solvent such as benzene, xylene, toluene, and ethylbenzene; or the like. Besides, the component (C) can be easily obtained by hydrogenating the obtained olefin block copolymer before hydrogenation.

The organic alkali metal compound used as a polymerization initiator may be an organic lithium compound, an organic sodium compound, or the like. Particularly, an organic lithium compound such as n-butyllithium, sec-butyllithium, or tert-butyllithium is preferable. The usage amount of the organic alkali metal compound is not particularly limited, and is usually 0.02 to 5 parts by mass, preferably 0.03 to 1.5 parts by mass with respect to 100 parts by mass of the monomer.

The polymerization temperature is usually −10° C. to 150° C., and preferably 0° C. to 120° C. The atmosphere of the polymerization system is preferably replaced with an inert gas such as a nitrogen gas. The polymerization pressure is not particularly limited and may be set within a pressure range sufficient to maintain the monomer and the solvent in a liquid phase. The method for adding the monomer to the polymerization system is not particularly limited and may be, for example, batch addition, continuous addition, intermittent addition, or a combination thereof.

The olefin block copolymer before hydrogenation may be a copolymer in which the molecular chains of a plurality of copolymers are bonded via coupling residues. This copolymer can be prepared by using a coupling agent with respect to the block copolymer obtained by the above method.

Usable coupling agents include, for example, divinylbenzene, 1,2,4-trivinylbenzene, epoxidized 1,2-polybutadiene, epoxidized soybean oil, epoxidized flaxseed oil, benzene-1,2,4-triisocyanate, dimethyl oxalate, diethyl phthalate, diethyl terephthalate, diethyl carbonate, 1,1,2,2-tetrachloroethane, 1,4-bis(trichloromethyl)benzene, trichlorosilane, methyltrichlorosilane, methyldichlorosilane, butyltrichlorosilane, tetrachlorosilane, dimethyldichlorosilane, (dichloromethyl)trichlorosilane, hexachlorodisilane, tetraethoxysilane, tetrachlorotin, 1,3-dichloro-2-propanone, and the like.

The component (C) can be obtained by partially or selectively hydrogenating the olefin block copolymer before hydrogenation obtained as described above. The method of hydrogenation and the reaction conditions are not particularly limited, and the hydrogenation is usually performed at 20° C. to 150° C. under hydrogen pressurization of 0.1 to 10 MPa in the presence of a hydrogenated catalyst.

The hydrogenation rate can be arbitrarily selected by changing the amount of the hydrogenated catalyst, the hydrogen pressure or reaction time during the hydrogenation reaction, and the like. The hydrogenated catalyst is usually a compound containing any one of metals of groups Ib, IVb, Vb, VIb, VIIb and VIII in Periodic Table, such as a compound containing Ti, V, Co, Ni, Zr, Ru, Rh, Pd, Hf, Re or Pt atoms. Specifically, for example, the hydrogenated catalyst may be: a metallocene compound of Ti, Zr, Hf, Co, Ni, Pd, Pt, Ru, Rh, Re or the like; a supported heterogeneous catalyst obtained by supporting a metal such as Pd, Ni, Pt, Rh or Ru on a simple substance such as carbon, silica, alumina or diatomaceous earth; a homogeneous Ziegler catalyst obtained by combining an organic salt of a metal element such as Ni or Co or an acetylacetone salt with a reducing agent such as organic aluminum; an organometallic compound or a complex of Ru or Rh; and a fullerene, a carbon nanotube or the like that has stored hydrogen therein. Particularly, from the viewpoint of a possible hydrogenation reaction in a homogeneous system in an inert organic solvent, a metallocene compound containing any one of Ti, Zr, Hf, Co and Ni is preferable. Furthermore, a metallocene compound containing any one of Ti, Zr and Hf is preferable. Particularly, a hydrogenated catalyst obtained by causing a titanocene compound to react with alkyllithium is preferable because the hydrogenated catalyst is an inexpensive catalyst particularly useful in industry. Besides, the above hydrogenated catalysts may be used alone, or two or more of the hydrogenated catalysts may be used in combination. After hydrogenation, if necessary, catalyst residues are removed or a phenol or amine anti-aging agent is added, and then the component (C) is isolated. The component (C) is isolated by, for example, a method of adding acetone, alcohol or the like to the hydrogenated diene copolymer solution and performing precipitation, a method of putting the hydrogenated diene copolymer solution into boiling water under stirring and removing the solvent by distillation, and the like.

The hydrogenation rate of the component (C) is preferably 80% or more, more preferably 90% or more, and particularly preferably 95% to 100%. When the hydrogenation rate is 80% or more, the thermal stability and the durability tend to be improved.

The number average molecular weight (Mn) of the component (C) is preferably 50,000 to 700,000, and more preferably 100,000 to 600,000. When the number average molecular weight (Mn) is 50,000 or more, the heat resistance, the strength, the fluidity, and the processability tend to be improved. When the number average molecular weight (Mn) is 700,000 or less, the fluidity, the processability, and the flexibility tend to be improved. Besides, the component (C) can be obtained by, for example, the method disclosed in Japanese Patent Laid-open No. 3-128957.

From the viewpoint of obtaining good adhesiveness to both a thermoplastic elastomer adherend and a crystalline ethylene resin adherend, the melt flow rate of the component (C) measured in accordance with JIS K7210 under the conditions of a temperature of 230° C. and a load of 21.2 N is preferably 0.1 to 20 g/10 min, more preferably 0.5 to 10 g/10 min, and particularly preferably 1 to 5 g/10 min.

The density of the component (C) measured in accordance with JIS K7112 is not particularly limited, and is preferably 0.85 g/cm³ or more and 0.95 g/cm³ or less, and more preferably 0.86 g/cm³ or more and 0.92 g/cm³ or less.

A plurality of hydrogenated olefin block copolymers obtained as described above, which are bonded via a coupling agent residue, can also be used as the component (C). That is, the component (C) may be [(c1)-(c2)-(c1)]$_n$-X (wherein n represents an integer equal to or greater than 3, and X represents a coupling agent residue). Furthermore, if the coupling agent residue has a sufficiently small molecular weight with respect to the block (c1) and the block (c2) and does not affect the crystallinity of the component (C), the component (C) may be [(c1)-(c2)]$_n$-X (wherein n represents an integer equal to or greater than 3, and X represents a coupling agent residue).

In addition, the component (C) may be a modified hydrogenated olefin block copolymer modified with a functional group. As the functional group, at least one selected from the group consisting of a carboxy group, an acid anhydride group, a hydroxy group, an epoxy group, a halogen atom, an amino group, an isocyanate group, a sulfonyl group, a sulfonate group, and an oxazoline group can be used. As the modification method, a known method can be used. The content of the functional group in the modified hydrogenated olefin block copolymer is preferably 0.01 to 10 mol %, more preferably 0.1 to 8 mol %, and particularly preferably 0.15 to 5 mol % when the entire repeating unit constituting the modified hydrogenated olefin block copolymer is 100 mol %. Preferred monomers that can be used to introduce the functional group include acrylic acid, methacrylic acid, itaconic acid, maleic acid, maleic anhydride, glycidyl acrylate, glycidyl methacrylate, allyl glycidyl ether, hydroxyethyl methacrylate, hydroxypropyl methacrylate, hydroxyethyl acrylate, hydroxypropyl acrylate, dimethylaminoethyl methacrylate, and the like.

When the total mass of the thermoplastic elastomer composition is 100 parts by mass, the content ratio of the component (C) is preferably 4 to 50 parts by mass, more preferably 5 to 40 parts by mass, and particularly preferably 6 to 30 parts by mass.

1.4. Component (D)

The thermoplastic elastomer composition according to the embodiment contains a crystalline ethylene resin (D). The component (D) is a resin having ethylene as a main repeating unit. The component (D) may contain a repeating unit derived from a monomer other than ethylene. According to the thermoplastic elastomer composition of the embodiment, it has been clarified that particularly by using the component (C) and the component (D) in combination, a molded product (composite member) can be manufactured which has both good adhesiveness to a thermoplastic elastomer adherend and good adhesiveness to a crystalline ethylene resin adherend.

The monomer other than ethylene may be: an α-olefin having 3 to 10 carbon atoms; a conjugated diene compound having 4 to 8 carbon atoms such as 1,3-butadiene, 2-methyl-1,3-butadiene, 1,3-pentadiene, and 2,3-dimethyl-1,3-butadiene; a non-conjugated diene compound having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; vinyl carboxylate such as vinyl acetate; unsaturated carboxylate such as methyl acrylate, ethyl acrylate, butyl acrylate, methyl methacrylate, and ethyl methacrylate; unsaturated carboxylic acid such as acrylic acid and methacrylic acid.

The component (D) may be an ethylene homopolymer or an ethylene copolymer that contains a repeating unit derived from ethylene and a repeating unit derived from a monomer other than ethylene. Particularly, the component (D) is preferably an ethylene homopolymer, an ethylene-propylene copolymer, an ethylene-1-butene copolymer, an ethylene-1-pentene copolymer, an ethylene-4-methyl-1-pentene copolymer, or an ethylene-1-hexene copolymer, and more preferably a high-density polyethylene. In addition, it is also preferable to use polyethylene (D1) having a weight average molecular weight of 1,000 to 30,000 as a part of the component (D) or the entire component (D). When the component (D) is 100 mass %, the component (D1) used in the component (D) is preferably 20 mass % or more, and more preferably 40 mass % or more. On the other hand, the entire component (D) may be the component (D1), but the component (D1) in the component (D) is preferably 80 mass % or less, and more preferably 60 mass % or less.

From the viewpoint of obtaining good adhesiveness to a molded product consisting of a crystalline ethylene resin, the melt flow rate of the component (D) measured in accordance with JIS K7210 under the conditions of a temperature of 190° C. and a load of 21.2 N is preferably 0.01 to 200 g/10 min, more preferably 1 to 100 g/10 min, and particularly preferably 5 to 30 g/10 min. When the component (D1) is used, from the viewpoint of obtaining very good adhesiveness to a molded product consisting of a crystalline ethylene resin, the melt viscosity of the component (D1) measured at a temperature of 140° C. is preferably 10 to 30,000 mPa·s, more preferably 30 to 25,000 mPa·s, and particularly preferably 100 to 10,000 mPa·s.

The density of the component (D) measured in accordance with JIS K7112 is not particularly limited, and is preferably 0.91 g/cm³ or more and 0.97 g/cm³ or less, and more preferably 0.94 g/cm³ or more and 0.97 g/cm³ or less.

The component (D) can be produced by polymerizing ethylene and, if necessary, a monomer other than ethylene in the presence of a polymerization catalyst such as a Ziegler•Natta catalyst or a metallocene catalyst. The polymerization method may be solution polymerization, bulk polymerization, slurry polymerization, gas phase polymerization or the like, and two or more of these methods may be combined.

When the total mass of the thermoplastic elastomer composition is 100 parts by mass, the content ratio of the component (D) is preferably 10 to 50 parts by mass, more preferably 12 to 45 parts by mass, and particularly preferably 15 to 40 parts by mass.

1.5. Other Additives

In addition to the above components, additives such as a cross-linking agent, a cross-linking aid, an anti-aging agent, a weather resistant agent, a fatty acid derivative, a silicone compound, a coloring agent (for example, oxidation titanium, carbon black, or the like), and a stretching oil may be added as necessary to the thermoplastic elastomer composition according to the embodiment.

<Cross-Linking Agent and Cross-Linking Aid>

The cross-linking agent may be an organic peroxide, a sulfur compound, an alkylphenol resin or the like. Particularly, an organic peroxide is preferable.

The organic peroxide includes ketone peroxides, diacyl peroxides, hydroperoxides, dialkyl peroxides, peroxyketals, alkyl peresters, percarbonates, peroxydicarbonates, peroxyesters, and the like. Specific examples of the organic peroxide include: dicumyl peroxide, 2,5-dimethyl-2,5-di(tert-butylperoxy)hexane, 2,5-dimethyl-2,5-di(tert-butylperoxy)hexine, 1,3-bis(tert-butylperoxyisopropyl)benzene, tert-butylcumyl peroxide, di-tert-butyl peroxide, 2,2,4-trimethylpentyl-2-hydroperoxide, diisopropylbenzohydroperoxide, cumene peroxide, tert-butyl peroxide, 1,1-di(tert-butylperoxy)3,5,5-trimethylcyclohexane, 1,1-di-tert-butylperoxycyclohexane, isobutyl peroxide, bis-3,5,5-trimethylhexanoyl peroxide, lauroyl peroxide, benzoyl peroxide, p-chlorobenzoyl peroxide, and the like.

In addition, in order to increase the degree of cross-linking of the component (A), a cross-linking agent and a cross-linking aid may be used in combination. As the cross-linking aid, a compound having two or more double bonds is preferable. Specific examples of the cross-linking aid include: peroxides such as N,N'-m-phenylene bismaleimide, toluylene bismaleimide, p-quinone dioxime, nitrosobenzene, diphenylguanidine, and trimethylolpropane; divinylbenzene, triallyl cyanurate, triallyl isocyanurate, ethylene glycol dimethacrylate, polyethylene glycol dimethacrylate, trimethylolpropane trimethacrylate, allyl methacrylate, and the like.

<Anti-Aging Agent>

By containing an anti-aging agent in the thermoplastic elastomer composition according to the embodiment, thermal decomposition is suppressed and the thermoplastic elastomer composition can withstand molding at a high temperature, and heat resistance may be improved at a fused portion between a molded product obtained by molding the composition and another molded product.

The anti-aging agent may be a hindered amine compound, a hydroquinone compound, a hindered phenol compound, a sulfur-containing compound, a phosphorus-containing compound, a naphthylamine compound, a diphenylamine compound, a p-phenylenediamine compound, a quinoline compound, a hydroquinone derivative compound, a monophenol compound, a bisphenol compound, a trisphenol compound, a polyphenol compound, a thiobisphenol compound, a hindered phenol compound, a phosphite ester compound, an imidazole compound, a nickel dithiocarbamate compound, a phosphoric acid compound, or the like. These anti-aging agents may be used alone, or two or more of the anti-aging agents may be used in combination.

A commercially available product can also be used as the anti-aging agent. For example, trade names "ADEKA STAB AO-60", "ADEKA STAB 2112", and "ADEKA STAB AO-412S" manufactured by ADEKA and the like can be used.

<Fatty Acid Derivative>

The fatty acid derivative includes, for example, fatty acids, fatty acid esters, fatty acid amides, fatty acid metal salts, and the like. The fatty acids include: linear saturated fatty acids such as lauric acid, myristic acid, palmitic acid, stearic acid, araquinic acid, behenic acid, lignoceric acid, cerotic acid, montanic acid, and melissic acid; unsaturated fatty acids such as sethalic acid and sorbic acid; aromatic carboxylic acids such as benzoic acid and phenylacetic acid; and the like. The fatty acid ester is preferably an ester of a higher fatty acid having 8 or more carbon atoms, for example, stearyl stearate, lauryl stearate, stearyl palmitate, lauryl palmitate, glyceride tristearate, glyceride tripalmitinate, and the like. The fatty acid amides include: saturated fatty acid amides such as lauric acid amide, myristic acid amide, palmitic acid amide, stearic acid amide, and behenic acid amide; and unsaturated fatty acid amides such as oleic acid amide, linoleic acid amide, linolenic acid amide, erucic acid amide, arachidonic acid amide, eikosapentaenoic acid amide, and docosahexaenoic acid amide. Among these fatty acid amides, unsaturated fatty acid amides are preferable, and erucic acid amide and oleic acid amide are more preferable. The fatty acid metal salts include sodium salts, potassium salts, calcium salts, aluminum salts, zinc salts and the like of fatty acids having 10 to 25 carbon atoms.

1.6. Method for Producing Thermoplastic Elastomer Composition

The thermoplastic elastomer composition according to the embodiment is not particularly limited, but it is preferable that components other than the component (C) and the component (D) (that is, the component (A), the component (B), and other additives) are melt-kneaded first to obtain a thermoplastic elastomer intermediate, and then the component (C) and the component (D) are further added to the thermoplastic elastomer intermediate and melt-kneaded to thereby produce the thermoplastic elastomer composition. The melt-kneading of the raw material components is performed by a melt-kneading method using a general mixer such as a banbury mixer, a single-screw extruder, a twin-screw extruder, a kneader, a multi-screw extruder, or a roll.

1.7. Applications of Thermoplastic Elastomer Composition

In recent years, due to the diversification of automobile designs, when a weather strip is designed, there is an increasing need for composite members in which a molded product consisting of a thermoplastic elastomer composition and a molded product consisting of a crystalline ethylene resin are melt-adhered. According to the conventional thermoplastic elastomer composition, although the adhesiveness to the molded product consisting of a thermoplastic elastomer composition is excellent, the adhesiveness to the molded product consisting of a crystalline ethylene resin is not sufficient. Particularly, there is a tendency that the heat resistance at a fused portion between the molded product consisting of a thermoplastic elastomer composition and the molded product consisting of a crystalline ethylene resin is insufficient, and the fused portion is easily destroyed by heating.

On the other hand, according to the thermoplastic elastomer composition of the embodiment, a molded product can be obtained which has excellent adhesiveness to both a thermoplastic elastomer adherend and a crystalline ethylene resin adherend and also has excellent heat resistance at the fused portion. Thus, the thermoplastic elastomer composition according to the embodiment is suitably used as a material for producing a weather strip material.

2. Weather Strip

A weather strip according to one embodiment of the disclosure uses a molded product consisting of the thermoplastic elastomer composition described above. By using the thermoplastic elastomer composition described above, a composite member in which a thermoplastic elastomer molded product and another molded product are joined can be manufactured. Here, another molded product may be a thermoplastic elastomer molded product, a crystalline ethylene resin molded product, or the like.

The composite member can be manufactured by injection molding. Specifically, the composite member can be manufactured by, for example, a method in which another molded product as described above is arranged in advance in a split mold for injection molding, then the above thermoplastic elastomer composition is injected into the split mold by injection molding, and cooling is performed subsequently.

In this injection molding, from the viewpoint of adhesiveness between the thermoplastic elastomer molded product and another molded product in the composite member, it is preferable that, for example, a cylinder temperature of 200° C. to 270° C., an injection rate of 10 to 100 cc/sec, and a mold cooling temperature of 30° C. to 60° C. are set.

3. Example

Specific Examples of the disclosure are described below, but the disclosure is not limited to these Examples. Besides, "%" in the following production examples, Examples and comparative examples is based on mass unless otherwise specified.

3.1. Production of Thermoplastic Elastomer Composition

An ethylene-α-olefin copolymer rubber (A), a crystalline propylene resin (B), a cross-linking agent, a cross-linking aid, a black pigment, an anti-aging agent, a weather resistant agent, a higher fatty acid amide, polydimethylsiloxane A (kinematic viscosity 100 cSt), and polydimethylsiloxane B (kinematic viscosity 1000 cSt) of the type and the amount shown in Table 1 below were melt-kneaded, and a thermoplastic elastomer composition intermediate was produced. Next, a thermoplastic elastomer intermediate, an olefin block copolymer (C) or an olefin block copolymer (C'), and a crystalline ethylene resin (D) of the type and the amount shown in Table 1 below were melt-kneaded, and each thermoplastic elastomer composition used in Examples 1 to 5 and comparative examples 1 to 3 were produced.

3.2. Evaluation Method 3.2.1. Production of Adherend (1) Production of Thermoplastic Elastomer Adherend A sheet was produced, which is obtained by using an injection molding machine (manufactured by Nippon Steel Works Co., Ltd., trade name "J110ADS") to mold "Santoprene 121-73W175" manufactured by Exxon Mobil into a size of 120 mm×120 mm×2 mm. This sheet was punched into a length of 60 mm and a width of 50 mm with a dumbbell cutter, and then was used as a thermoplastic elastomer adherend.

(2) Production of Crystalline Ethylene Resin Adherend

A sheet was produced, which is obtained by using an injection molding machine (manufactured by Japan Steel Works, trade name "J110ADS") to mold "Novatec HD HJ590N" manufactured by Japan Polyethylene Corporation into a size of 120 mm×120 mm×2 mm. This sheet was punched into a length of 60 mm and a width of 50 mm with a dumbbell cutter, and then was used as a crystalline ethylene resin adherend.

3.2.2. Production of Joined Body (1) Production of Joined Body with Thermoplastic Elastomer Adherend First, the thermoplastic elastomer adherend produced above was attached in advance in a split mold of an injection molding machine (manufactured by Nippon Steel Works Co., Ltd., trade name "J110ADS"). Next, any one of the thermoplastic elastomer compositions produced above was injection-molded (at an injection temperature of 260° C. and a mold cooling temperature of 45° C.) in a notch (in the split mold to which the thermoplastic elastomer adherend is attached) so as to fit in the notch, and a flat plate (120 mm×120 mm×2 mm (length×width×thickness)) was obtained in which the above thermoplastic elastomer composition and the above thermoplastic elastomer adherend are injection-fused. Next, this flat plate was punched with a JIS-2 dumbbell cutter to obtain a test piece (dumbbell-shaped test piece).

(2) Production of Joined Body with Crystalline Ethylene Resin Adherend

First, the crystalline ethylene resin adherend produced above was attached in advance in a split mold of an injection molding machine (manufactured by Nippon Steel Works Co., Ltd., trade name "J110ADS"). Next, any one of the thermoplastic elastomer compositions produced above was injection-molded (at an injection temperature of 260° C. and a mold cooling temperature of 45° C.) in a notch (in the split mold to which the crystalline ethylene resin adherend is attached) so as to fit in the notch, and a flat plate (120 mm×120 mm×2 mm (length×width×thickness)) was obtained in which the above thermoplastic elastomer composition and the above crystalline ethylene resin adherend are injection-fused. Next, this flat plate was punched with a JIS-2 dumbbell cutter to obtain a test piece (dumbbell-shaped test piece).

3.2.3. Evaluation Test

Each test piece produced above was evaluated by performing the following tests. The results are shown in Table 1 below.

(1) Adhesiveness

Each test piece produced above was bent 180 degrees starting from the injection-fused portion and evaluated according to the following criteria.

(Evaluation Criteria)

A: The fused portion is not broken after ten times of bending, and the adhesiveness is very good.

B: The fused portion is not broken after five times of bending, and the adhesiveness is good.

C: The fused portion is broken after one time of bending, and the adhesiveness is poor.

(2) Heat Resistance

The test piece obtained above was suspended in a constant temperature bath adjusted to 85° C. with a load of 200 gf on one end, allowed to stand for 2 hours, 24 hours, and 48 hours, and evaluated according to the following criteria.

(Evaluation Criteria)

A: The fused portion after standing for 48 hours is not broken, and the heat resistance is very good.

B: The fused portion after standing for 24 hours is not broken, and the heat resistance is good.

C: The fused portion standing for less than 2 hours is broken, and the heat resistance is poor.

3.3. Evaluation Result

Table 1 below shows the composition of the thermoplastic elastomer compositions produced in each Example and comparative example, and the evaluation results.

TABLE 1

| | Example 1 | Example 2 | Example 3 | Example 4 | Example 5 | Comparative example 1 | Comparative example 2 | Comparative example 3 |
|---|---|---|---|---|---|---|---|---|
| [Composition of thermoplastic elastomer intermediate] | | | | | | | | |
| Ethylene-α-olefin copolymer rubber (A) | 87 | 87 | 87 | 87 | 87 | 87 | 87 | 87 |
| α-olefin crystalline thermoplastic resin (B-1) | 10 | | | 10 | 10 | 10 | 10 | 10 |

TABLE 1-continued

|  | Example 1 | Example 2 | Example 3 | Example 4 | Example 5 | Comparative example 1 | Comparative example 2 | Comparative example 3 |
|---|---|---|---|---|---|---|---|---|
| α-olefin crystalline thermoplastic resin (B-2) |  | 10 |  |  |  |  |  |  |
| α-olefin crystalline thermoplastic resin (B-3) |  |  | 10 |  |  |  |  |  |
| Cross-linking agent | 1 | 1 | 1 | 1 | 1 | 1 | 1 | 1 |
| Cross-linking aid | 0.5 | 0.5 | 0.5 | 0.5 | 0.5 | 0.5 | 0.5 | 0.5 |
| Black pigment | 8.5 | 8.5 | 8.5 | 8.5 | 8.5 | 8.5 | 8.5 | 8.5 |
| Anti-aging agent | 0.1 | 0.1 | 0.1 | 0.1 | 0.1 | 0.1 | 0.1 | 0.1 |
| Weather resistant agent | 0.3 | 0.3 | 0.3 | 0.3 | 0.3 | 0.3 | 0.3 | 0.3 |
| Higher fatty acid amide | 0.3 | 0.3 | 0.3 | 0.3 | 0.3 | 0.3 | 0.3 | 0.3 |
| Polydimethyl-siloxane A | 1.8 | 1.8 | 1.8 | 1.8 | 1.8 | 1.8 | 1.8 | 1.8 |
| Polydimethyl-siloxane B | 2.3 | 2.3 | 2.3 | 2.3 | 2.3 | 2.3 | 2.3 | 2.3 |
| [Composition of thermoplastic elastomer composition] | | | | | | | | |
| Thermoplastic elastomer intermediate | 65 | 65 | 65 | 65 | 65 | 65 | 65 | 65 |
| Olefin block polymer (C) | 10 | 10 | 10 | 10 | 10 |  |  |  |
| Olefin block polymer (C') |  |  |  |  |  | 10 |  |  |
| Crystalline ethylene resin (D-1) | 25 | 25 | 25 | 15 | 10 | 25 | 25 |  |
| Crystalline ethylene resin (D-2) |  |  |  | 10 | 15 |  |  |  |
| [Evaluation of joint with thermoplastic elastomer] | | | | | | | | |
| Adhesiveness | B | B | B | A | A | B | C | A |
| Heat resistance | A | A | B | A | A | C | C | A |
| [Evaluation of joint with crystalline ethylene resin] | | | | | | | | |
| Adhesiveness | B | B | B | A | A | B | B | C |
| Heat resistance | A | A | B | A | A | C | A | C |

The following components were used as each component listed in Table 1 above.

Ethylene-α-olefin copolymer rubber (A): a mixture of ethylenepropylene 5-ethylidene-2-norbornene ternary copolymer (ethylene unit content 66 mass %, 5-ethylidene-2-norbornene unit content 4.5 mass %, extreme viscosity 4.6) 50 mass % and paraffin softener (Diana Process Oil PW90, manufactured by Idemitsu Kosan Co., Ltd.)

α-olefin crystalline thermoplastic resin (B-1): trade name "Novatec PP MA2", manufactured by Japan Polypropylene Corporation, propylene homopolymer, melting point 159° C., density 0.90 g/cm$^3$, melt flow rate (230° C., load 21.2 N) 16 g/10 min α-olefin crystalline thermoplastic resin (B-2): trade name "Novatec PP FL02A", manufactured by Japan Polypropylene Corporation, propylene random copolymer, melting point 139° C., density 0.90 g/cm$^3$, melt flow rate (230° C., load 21.2 N) 20 g/10 min α-olefin crystalline thermoplastic resin (B-3): trade name "Novatec PP FX4E", manufactured by Japan Polypropylene Corporation, propylene random copolymer, melting point 132° C., density 0.90 g/cm$^3$, melt flow rate (230° C., load 21.2 N) 5.3 g/10 min Olefin block copolymer (C): trade name "DYNARON 6200P", manufactured by JSR, density 0.88 g/cm$^3$, melt flow rate (230° C., load 21.2 N) 2.5 g/10 min, a hydrogenated block copolymer obtained by hydrogenating a block copolymer which has a conjugated diene polymer block with a 1,2-vinyl bond content of 25 mol % or less at both ends and also has a conjugated diene polymer block with a 1,2-vinyl bond content of more than 25 mol % in the middle Olefin block copolymer (C'): trade name "INFUSE 9007", manufactured by Dow Chemical Co., Ltd., density 0.87 g/cm$^3$, melt flow rate (230° C., load 21.2 N) 0.5 g/10 min, an ethylene.octen-1 copolymer Crystalline ethylene resin (D-1): trade name "Novatec HD HJ490", manufactured by Japan Polyethylene Corporation, weight average molecular weight 120,000, melting point 131° C., density 0.96 g/cm$^3$, melt flow rate (190° C., load 21.2 N) 20 g/10 min, an ethylene propylene copolymer Crystalline ethylene resin (D-2): trade name "LICOCENE PE 5301", manufactured by Clariant, weight average molecular weight 4,800, melting point 129° C., polyethylene Crossing-linking agent: trade name "Perhexa 25B-40", manufactured by Nichiyu Co., Ltd., 2,5-dimethyl-2,5-di (tert-butylperoxy)hexane Cross-linking aid: trade name "Barnock PM", manufactured by Ouchi Shinko Kagaku Kogyo Co., Ltd., N,N'-m-phenylene bismaleimide Black pigment: a mixture of a crystalline propylene resin and carbon black (carbon black content 40%)

Anti-aging agent: trade name "ADEKA STAB AO-60", manufactured by ADEKA, pentaerythritol tetrakis [3-(3,5-di-tert-butyl-4-hydroxyphenyepropionate]

Weather resistant agent: trade name "ADEKA STAB LA-52", manufactured by ADEKA, tetrakis(1,2,2,6,6-pentamethyl-4-piperidyl)butane-1,2,3,4-tetracarboxylate Higher fatty acid amide: trade name "Neutron-S", manufactured by Nippon Fine Chemical Co., Ltd., erucic acid amide Polydimethylsiloxane A: trade name "DOWSIL SH200 Fluid 100 cSt", manufactured by Dow Toray, kinematic viscosity: 100 cSt Polydimethylsiloxane B: trade name "DOWSIL SH200 Fluid 1000 cSt", manufactured by Dow Toray, kinematic viscosity: 1000 cSt As is clear from the evaluation results in Table 1 above, according to the thermoplastic elastomer composition of Example 1, a joined body can be obtained which has excellent adhesiveness to both the thermoplastic elastomer adherend and the crystalline ethylene resin adherend and also has excellent heat resistance at the fused portion.

The thermoplastic elastomer composition of comparative example 1 contains the olefin block copolymer (C') instead of the component (C). Therefore, although the thermoplastic elastomer composition is adhered to the thermoplastic elastomer adherend or the crystalline ethylene resin adherend, the heat resistance is insufficient at both the fused portion with the thermoplastic elastomer adherend and the fused portion with the crystalline ethylene resin adherend.

The thermoplastic elastomer composition of comparative example 2 does not contain the component (C). Therefore, the adhesiveness and the heat resistance of the joined body with the thermoplastic elastomer adherend are insufficient.

The thermoplastic elastomer composition of comparative example 3 does not contain the component (C) or the component (D). Therefore, the adhesiveness and the heat resistance of the joined body with the crystalline ethylene resin adherend are insufficient.

The disclosure is not limited to the above embodiment, and various modifications are possible. The disclosure includes configurations substantially the same as those described in the embodiment (for example, configurations with the same function, method and result, or configurations with the same purpose and effect). In addition, the disclosure includes a configuration in which a non-essential part of the configuration described in the above embodiment is replaced with another configuration. Furthermore, the disclosure also includes a configuration that exhibits the same effect as the configuration described in the above embodiment or a configuration that can achieve the same purpose. Furthermore, the disclosure also includes a configuration in which a known technique is added to the configuration described in the above embodiment.

What is claimed is:

1. A weather strip, using a molded product consisting of a thermoplastic elastomer composition, wherein the thermoplastic elastomer composition contains:
   an ethylene-α-olefin copolymer rubber (A);
   an α-olefin crystalline thermoplastic resin (B);
   an olefin block copolymer (C) being a hydrogenation product of a block copolymer which has a conjugated diene polymer block (c1) with a 1,2-vinyl bond content of 25 mol % or less at both ends and also has a conjugated diene polymer block (c2) with a 1,2-vinyl bond content of more than 25 mol % in the middle; and
   a crystalline ethylene resin (D),
   wherein when the total mass of the thermoplastic elastomer composition is 100 parts by mass,
   the content ratio of the ethylene-α-olefin copolymer rubber (A) is 10 to 50 parts by mass, the content ratio of the α-olefin crystalline thermoplastic resin (B) is 1 to 15 parts by mass, the content ratio of the crystalline ethylene resin (C) is 4 to 50 parts by mass, and the content ratio of the crystalline ethylene resin (D) is 10 to 50 parts by mass.

2. The weather strip according to claim 1, wherein the crystalline ethylene resin (D) comprises polyethylene (D1) having a weight average molecular weight of 1,000 to 30,000.

3. The weather strip according to claim 1, wherein the melting point of the α-olefin crystalline thermoplastic resin (B) is 135° C. or higher.

4. The weather strip according to claim 1, wherein when the total of the conjugated diene polymer block (c1) and the conjugated diene polymer block (c2) contained in the crystalline ethylene resin (C) is 100 parts by mass, the content ratio of the conjugated diene polymer block (c1) is 5 to 90 parts by mass.

5. The weather strip according to claim 1, wherein the molded product is used as a corner material.

6. A thermoplastic elastomer composition for a weather strip material, containing:
   an ethylene-α-olefin copolymer rubber (A);
   an α-olefin crystalline thermoplastic resin (B);
   an olefin block copolymer (C) being a hydrogenation product of a block copolymer which has a conjugated diene polymer block (c1) with a 1,2-vinyl bond content of 25 mol % or less at both ends and also has a conjugated diene polymer block (c2) with a 1,2-vinyl bond content of more than 25 mol % in the middle; and
   a crystalline ethylene resin (D),
   wherein when the total mass of the thermoplastic elastomer composition is 100 parts by mass,
   the content ratio of the ethylene-α-olefin copolymer rubber (A) is 10 to 50 parts by mass, the content ratio of the α-olefin crystalline thermoplastic resin (B) is 1 to 15 parts by mass, the content ratio of the crystalline ethylene resin (C) is 4 to 50 parts by mass, and the content ratio of the crystalline ethylene resin (D) is 10 to 50 parts by mass.

7. The thermoplastic elastomer composition for a weather strip material according to claim 6, wherein the crystalline ethylene resin (D) comprises polyethylene (D1) having a weight average molecular weight of 1,000 to 30,000.

8. The thermoplastic elastomer composition for a weather strip material according to claim 6, wherein the melting point of the α-olefin crystalline thermoplastic resin (B) is 135° C. or higher.

9. The thermoplastic elastomer composition for a weather strip material according to claim 6, wherein when the total of the conjugated diene polymer block (c1) and the conjugated diene polymer block (c2) contained in the crystalline ethylene resin (C) is 100 parts by mass, the content ratio of the conjugated diene polymer block (c1) is 5 to 90 parts by mass.

* * * * *